United States Patent Office 2,753,287
Patented July 3, 1956

2,753,287

ORGANIC DISPERSION TYPE ADHESIVES, THEIR PREPARATION AND APPLICATION

George Thomson, Milton, Mass., assignor to Millville Manufacturing Company, Millville, N. J., a corporation of New Jersey Application September 18, 1953, Serial No. 381,119

5 Claims. (Cl. 154—116)

This invention relates to improvements in organic dispersion type adhesive materials and their preparation and application. More particularly the invention is concerned with improved methods of preparing and utilizing a dispersion type adhesive of the organosol class in which ground particles of a binder compound, such as a vinyl polymer, for example, are suspended in an organic liquid component.

An outstanding characteristic of an organosol dispersion is that particles of resin binder compound are solvated in the organic liquid component and become converted into a swollen condition. The bonding strength of the binder particles in such a system can be fully realized by exposing a coating or layer of the swollen particles to heat of from 300° to 350° F. to induce fusion of the particles. In this way the use of expensive solvents is avoided and a better control of viscosity is often possible.

For certain types of bonding, and especially in bonding fabric surfaces and certain other sheet material surfaces, it is often highly desirable to provide the organosol type adhesive as a fluid body of relatively low viscosity in order to facilitate handling and promote thorough penetration and relatively uniform distribution of adhesive at localized areas of a fabric body especially. It has been found, however, that in certain instances of use the degree of adhesive strength developed by fused particles of organosol binder is not satisfactory.

It is an object of the invention to deal with this particular problem and to improve adhesives and especially to devise an improved organosol type of adhesive which is capable of developing bonding strength materially in excess of the bonding strength normally developed from relatively low viscosity type organosol adhesives. It is also an object of the invention to provide an improved method of preparing an organosol type of adhesive body, which method, by reason of its method of compounding, is capable of developing unusually high bonding strength, especially when impregnated in the fibers of a fabric body.

Figure 1:
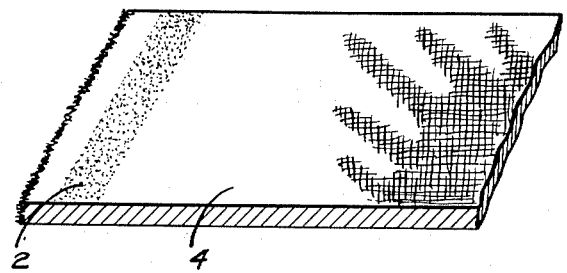
Figure 2:
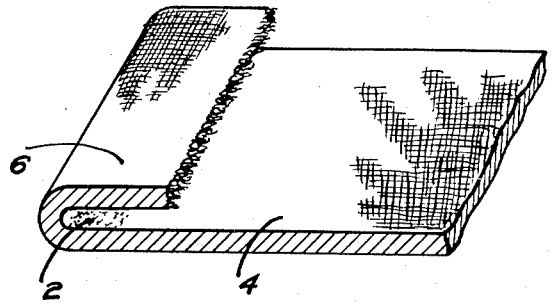
Figure 3:
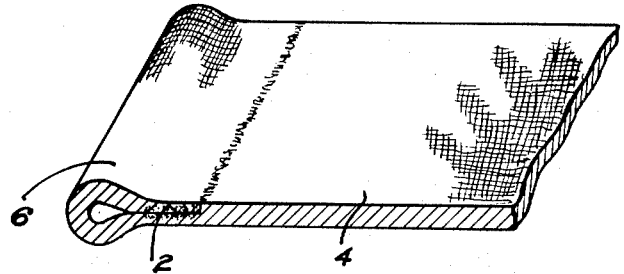

These and other objects and novel features will be more fully understood and appreciated from the following description of a preferred embodiment of the invention selected for purposes of illustration, and shown in the accompanying drawings in which:

Fig. 1 is a fragmentary perspective view of a piece of textile material illustrating a band of adhesive applied at one end thereof in accordance with the invention;

Fig. 2 is another fragmentary perspective view of a piece of textile material similar to that shown in Fig. 1 and further illustrating the end portion of the textile material folded over upon itself into contact with the band of adhesive material; and Fig. 3 is still another fragmentary perspective view of a textile material such as shown in Fig. 2 and illustrating a completed hem resulting from adhesively securing together abutting surfaces of the textile material.

The improved adhesive material of the invention is based upon the novel concept of bringing together, in an organosol type dispersion a quantity of ground resin particles of a relatively small average micron size and a lesser selected quantity of unground resin aggregates of a relatively large average micron size.

Furthermore, in one specific aspect the invention comprehends locating an organosol dispersion containing unground resin aggregates, as noted above, between two adjacent fabric surfaces and exposing both organosol particles and unground resin aggregates to heat to simultaneously induce fusing of these two different classes of resin particles while impregnated in the fiber surfaces.

I have discovered that by thus combining and applying differently sized resin particles in proper proportions in an organosol dispersion, and then simultaneously fusing the particles, I am enabled to control the distribution of binder particles, as well as their fusing action, in a selective manner at localized areas or regions, and in the case of two adjacent fabric surfaces I am enabled to develop materially increased bonding strength for holding the two fabric surfaces together without using excessive quantities of the adhesive.

In bringing together particles of two substantially different ranges of micron sizes, in accordance with the method of the invention, there may be visualized, for example, a fluid body made up of an organic component consisting of a conventional organic dispersant and organic diluent, together with a suitable filler, stabilizer, pigment, and the like. In this fluid body the relatively small micron size particles have been subjected to the necessary mechanical working required for producing a satisfactory organosol, an operation which may conveniently consist of grinding in a ball mill for a period of from 12 to 40 hours, and which results in the ground particles being reduced to an average micron size of from less than five-tenths of one micron up to one or two microns. These particles are in a swollen state and of such small micron, when exposed to heat, are readily adapted to fuse and strike into a surface such as that of a fibrous body.

In the case of the unground resin aggregates incorporated in the fluid body in accordance with the invention, it is pointed out that these resin aggregates are commonly produced and furnished to the trade as a powder, all of which passes a 20 mesh screen, for example, and such aggregates may, for example, have an average micron size running from 600 microns up to as large as 850 microns. Since these larger resin aggregates have not been subjected to the same grinding or mechanical working of the organosol type particles, the aggregates will not undergo the same degree of swelling and therefore they tend to fuse less readily and are not as adapted to spread out and flow as is the case with the organosol particles. Because of this difference these larger micron size aggregates can, therefore, function as reinforcing bodies comprising relatively concentrated masses of adhesive occurring at separated points throughout a fused film of resin and especially capable of cooperating with the fused portions of the smaller particles and adjacent fabric surfaces to provide an increased bonding strength of unusual and surprising nature.

In this connection I have discovered specifically that greatly improved bonding strength may be derived from an organosol type adhesive, when combined with fabric surfaces especially, by combining a proportionately large quantity of particles of a vinyl chloride-acetate resin occurring in the form of small agglomerates which have been broken down by a process of grinding with a proportionately small quantity of relatively coarse aggregates obtained from the same vinyl resin material.

Thus I find that I may produce my improved adhesive material by starting with a desired quantity of unground vinyl chloride-acetate resin and mixing this resin with suitable organic dispersants and diluents, together with desired fillers and stabilizers, and then subjecting this mixture to a ball milling operation for a period of from 12 to 24 hours, for example.

To this organosol mixture there may then be added a proportionate quantity of unmilled or unground vinyl chloride-acetate aggregates which are thoroughly incorporated throughout the organosol fluid without further grinding. This I find may be accomplished by a suitable stirring operation, such as by means of electric stirring mechanism of conventional nature. In this way the resin aggregates may be distributed fairly uniformly throughout the organosol without undergoing any subdivision and yet a limited degree of swelling may be induced on the aggregates so that they are capable of undergoing satisfactory fusion.

It is intended that the invention may be utilized in various types of bonding operations dealing with the bonding of fabric surfaces, as well as surfaces of various other sheet materials. However, for purposes of illustration of the invention in one preferred embodiment, there may be cited a particular type of fabric bonding wherein an organosol type adhesive is desired to be employed and where a greater than normal bonding strength must be developed in order to make the application commercially feasible.

Reference is had to the problem of hemming cloth items, such as diapers, wipe-up cloths, and similar articles, without resorting to stitching. In the case of diapers especially where it is desired to produce a hem by adhesively securing a folded over edge of the diaper material, an adhesive must be used which will resist washing and exposure to various chemicals and which is non-toxic. Further, the adhesive mix must be of a relatively low viscosity type such that its penetration into a fabric body may be carried out in a controlled manner. Finally, the adhesive must produce an unusually high bonding strength in order to maintain the hem portions of the diaper in firmly secured relationship during normal use of the garment.

I have found that I may successfully produce diaper hems, as well as hems for wipe-up cloths, towels, and similar items, by combining unground vinyl resin aggregates in controlled quantities with an organsol of the vinyl chloride-acetate type.

As illustrative of the use of specific compounds, materials, and proportions employed, the following formulations were prepared:

*Example I*

90 grams vinyl chloride-acetate resin binder, VYNV-1. (An organosol vinyl resin in powdered form manufactured by Union Carbide and Carbon Corporation. This vinyl chloride-acetate VYNV-1 consists of 95% vinyl chloride and 5% vinyl acetate.)

270 grams acrylic resin plasticizer, Paraplex G-50. (A non-migrating resin type plasticizer manufactured by Rohm and Haas Company. Paraplex G-50 is a linear polyester of adipic acid and a glycol, the polyester having a molecular weight of about 2200.

54 grams filler, Surfex. (A treated calcium carbonate made by R. T. Vanderbilt Company. For Surfex reference is made to U. S. Patent No. 2,034,797 for the general method of treatment. The patent covers a process of milling precipitated whiting (calcium carbonate) with .1 to 5% by weight of an acid organic material such as resin or stearic acid. This prevents caking and thus prolongs the effective grinding two or more times than possible without the use of resin or stearic acid. Some of the claims mention milling whiting with .1 to 5% of a compound having the formula X—(COO—R)$_n$ where X is an organic radical and R is either hydrogen or a metal. Vanstay is composed essentially of tri-sodium phosphate.)

20 grams filler, titanium dioxide. (Apco thinner is a super-varnish and paint maker's naphtha with a boiling range of 247 degrees to 290 degrees F. Its kauri butanol number is 46. The composition of Apco thinner is as follows:

| | Percent |
|---|---|
| Aromatic hydrocarbons | 29 |
| Paraffin hydrocarbons | 41 |
| Napthenic hydrocarbons | 30 |
| Olefin hydrocarbons | 0 |

5 grams stabilizer, Stabilizer #3. (A polymeric tin compound made by Advance Solvents & Chemical Corp. Stabilizer #3 consists of polymeric dialkyl tin dimethoxides of the general formula

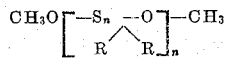

where R is alkyl and $n$ a numeral higher than 1. In this case of #3 Stabilizer $n$ is between 1 and 3. Stabilizer #3 is not a pure organo tin polymer. It contains a solic carrier which is necessary because the polymer in itself is not a uniform product, and the higher polymers would separate. Therefore, it is necessary to incorporate the polymer in a solid carrier.)

62 cc. dispersant, xylol organic solvent.

In one instance the above mix was made up in the following manner:

1. The xylene, Apco thinner, Paraplex plasticizer were first stirred together to form an organic liquid component comprising a dispersant-diluent mixture.
2. The Surfex, titanium dioxide and Vanstay was stirred into ⅓ of the liquid mix as made up in step #1.
3. The vinyl resin was dispersed or stirred into the remaining ⅔ of the liquid from #1.
4. The two mixtures (#2 and #3) were then combined and ball milled for 24 hours.

From the above formulation a sample of 50 grams was then taken and to this sample there was added a 10 gram sample of unmilled vinyl resin aggregates and the resulting mixture was stirred by use of an electric stirrer to thoroughly and uniformly distribute the resin aggregates throughout the ground particles, thus forming the adhesive of the invention.

A quantity of the resulting adhesive was then applied as a band of adhesive 2 to a cut marginal edge of a cotton textile fabric 4 of the type employed in making a diaper, as illustrated in Fig. 1. The coated marginal edge was then folded over upon itself to form a diaper hem 6, as shown in Fig. 2. Thereafter heat (300°–500° F.) was applied for a short period to the folded hem portions 6 of the diaper to simultaneously fuse both organosol particles and the resin aggregates as shown in Fig. 3.

The resulting bonded hem was found to be highly satisfactory for diaper purposes. This was evidenced by providing a three inch test sample of the hemmed diaper fabric and subjecting it to a pull-out test on an "Instron Tester" of conventional type.

In one specific instance the cut samples showed a maximum bonding strength of 32 on the tester as compared with a corresponding value of 21.5 for a three inch sample of diaper cloth bonded with regular organosol adhesive containing no aggregates.

A number of other similar tests were made and recorded. These tests constitute evidence of a substantial increase in bonding strength of an unusual and surprising nature, particularly important in that the added difference in strength was found to make possible a diaper hem which would withstand repeated washing and use without failure or separation, whereas without this increase in strength derived from the use of aggregates undesirable bonding results were experienced.

The exact manner of operation of the resin aggregates is not completely understood. It is believed that the larger masses of fused aggregates may function somewhat in the manner of coarse rock aggregates in a concrete mixture where the coarse aggregates are known to produce greater strength in shear and in tension. It is also believed that by applying to a diaper hem an organosol of relatively low viscosity in which some large resin aggregates are carried, the small organosol particles are able to partially penetrate the fabric surfaces and leave between the surfaces a sufficient quantity of resin in the form of coarse aggregates to develop maximum strength with a limited degree of penetration.

It should be understood that the invention is not intended to be limited to the above suggested theories or any other specific theory of operation, however.

In combining the relatively large resin aggregates with the organosol particles some variation in the range of proportions employed may be resorted to. For example, improvements in adhesion were observed upon the addition to a 50 gram sample of an organosol mix, such as that cited above, with two grams of unground resin aggregates. The mixture was found to penetrate or wet the fabric satisfactorily. A considerably improved adhesion was obtained with 5 grams and most adhesion strength was realized with approximately 10 grams. Over this amount a falling off in adhesive strength was observed. From this series of tests it is apparent that in a range of from, roughly, 5% to 20% of the weight of the organosol mix, the resin aggregates are highly effective, and above and below these proportions little, if any, advantage is derived. Larger proportions raised the viscosity to a point where the fabric was not wetted or penetrated satisfactorily.

From the foregoing description it will be evident that I have provided an improved adhesive material and an improved method of applying and using organosol type adhesives, and especially an improved method of employing an organosol type of adhesive in forming fabric hems for diapers and similar articles.

While I have disclosed in some detail specific materials, quantities, and methods of compounding, it should be understood that various changes may be resorted to in dealing with organosols within the scope of the appended claims.

Having thus described my invention, what I desire to claim as new is:

1. An improved fluid adhesive body, said body including an organosol which includes a quantity of polyvinyl chloride resin binder particles of from .5 up to 2 micron size dispersed in the vehicle, and a lesser quantity of polyvinyl chloride resin binder particles of from 600 to 800 micron size distributed throughout the fluid body.

2. An improved fluid adhesive body, said body consisting of an organosol containing finely ground swollen particles of a polyvinyl chloride-acetate binder, and a small quantity of relatively large micron size particles of a vinyl resin aggregate.

3. In a method of bonding in which swollen particles of an organosol type binder are coated on a surface and exposed to heat, the step which comprises simultaneously fusing a quantity of relatively coarse binder particles which cooperate with the said first particles to control the degree of bonding strength produced.

4. In a method of securing fabric surfaces, the steps which include locating a coating of an organosol dispersion containing unground resin aggregates between two adjacent fabric surfaces, then exposing both the organosol particles and unground resin aggregates to heat and simultaneously inducing fusion of both the organosol particles and the aggregates while impregnated in the fabric surfaces.

5. In a method of producing a hem in a diaper, the steps which include locating along a marginal edge of a diaper fabric an organosol dispersion containing unground resin aggregates, then folding the portions of the said marginal edge bearing the organosol dispersion upon itself, and then exposing the fabric organosol particles and unground resin aggregates to heat to simultaneously induce fusion of both the organosol particles and the aggregates while contained between the folded marginal edge portions of the diaper.

References Cited in the file of this patent

UNITED STATES PATENTS

| | | |
|---|---|---|
| 2,553,916 | Halbig | May 22, 1951 |
| 2,600,122 | Meyer et al. | June 10, 1952 |
| 2,619,089 | Swartz | Nov. 25, 1952 |
| 2,668,787 | Schramm | Feb. 9, 1954 |